Sept. 20, 1955 R. C. BERKER 2,718,158
GILL DRAWING MACHINE DRIVE
Filed Oct. 25, 1951
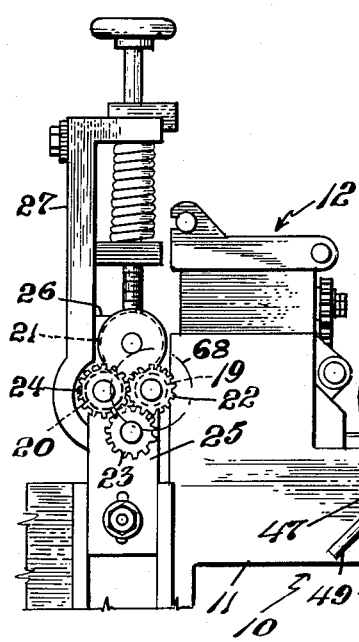
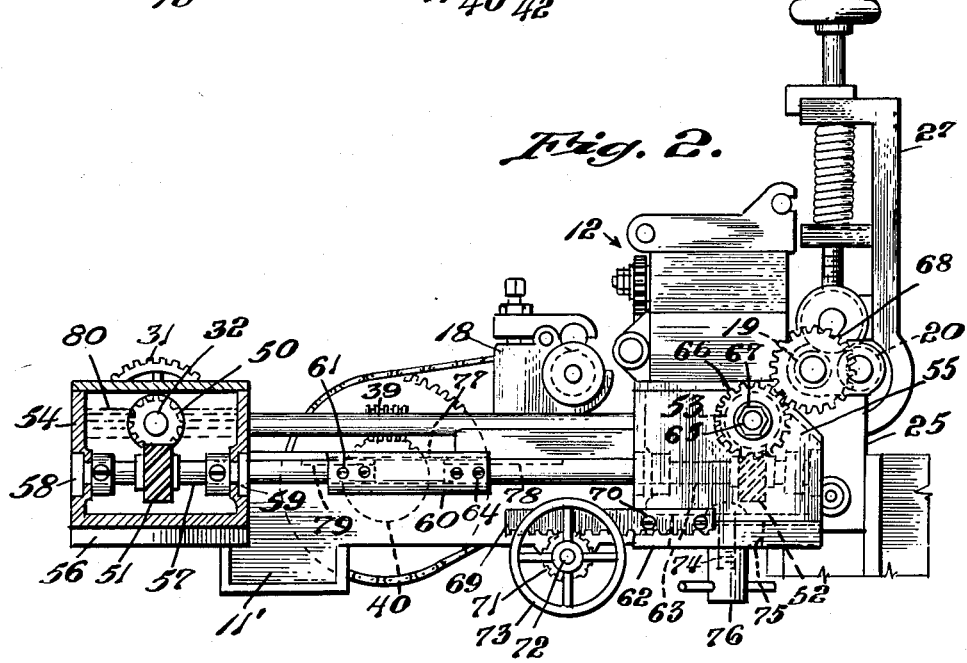
INVENTOR.
Ralph C. Berker
BY
Barlow & Barlow
ATTORNEYS.

United States Patent Office 2,718,158
Patented Sept. 20, 1955

2,718,158

GILL DRAWING MACHINE DRIVE

Ralph C. Berker, Hoxsie, R. I.

Application October 25, 1951, Serial No. 253,042

3 Claims. (Cl. 74—665)

This invention relates to improvements in a gill drawing frame or gill box, particularly in the engagement for driving the various moving parts thereof.

The usual means for transmitting motion from a power source such as an electric motor to various moving parts of a gill drawing frame such as a front draft roller, back feed rollers, and faller screws is by means of gear trains, some of which gears are of relatively large sizes and supported on the outer side of the gill frame. Such trains of gears are heavy and not desirable for manufacturing reasons and do not permit high-speed operation in machines of this type.

It has been proposed to substitute for the usual gear train an all-chain drive for driving the main elements of the machine. Such a drive has been found unsatisfactory in that the wool sliver becomes undesirably wavy.

An object of this invention is to provide a drive for a gill drawing frame in which the elements of the drive will be more compactly related and in which the said elements will be driven in a smooth manner.

Another object of the invention is to provide a drive for a gill drawing frame so constructed as to permit a higher speed of operation.

A more specific object of the invention is to provide a drive for a gill drawing frame in which the gears will be enclosed so as to be rotatable in a lubricant.

Another object of the invention is to provide a drive for a gill drawing frame in which one change gear may be substituted for another and moved into engagement by a sliding motion of its support.

Another object of the invention is to provide a drive for a gill drawing frame in which the back roller of the machine will be driven from a faller screw shaft.

With these and other objects in view, the invention consists of certain novel features of construction as will be more fully described and particularly pointed out in the appended claims.

In the accompanying drawings:

Figure 1 is a side elevational view of a fragmental portion of a gill drawing frame.

Figure 2 is a similar view of the opposite side of the machine shown in Figure 1.

Figure 3 is a plan view of a diagrammatic showing of the drive for the front draft roller and the back roller.

Referring to the drawings for a more detailed description of the invention, 10 designates generally an intersecting gill frame or machine, only so much of which is shown as is believed necessary for a clear understanding of the invention.

The machine comprises side frames 11—11' which are tied to each other in space relation by means of laterally extending members (not shown) providing a support for a gill head 12 which may be of any conventional manufacture having the usual faller combs (not shown) operated through means of faller screws with shafts 13—14 formed integral therewith or otherwise provided. The wool sliver (not shown) is fed to the faller combs by means of back rollers 15—16 between which the sliver passes. These rollers, the lower of which driven, are journaled for rotation in supports 17—18 which are fastened to the side frames 11—11' respectively in any appropriate manner.

The sliver is passed through the combs which operate in a usual manner to straighten and make parallel the fibers thereof and is drawn from the combs by means of front draft rollers 19, 20, and 21. The lower rollers 19—20 are driven at one end thereof at the same surface speed one from the other by means of a gear 22 carried by the roller 19 which gear engages with a gear 23 which in turn is engaged by a gear 24 carried by the roller 20. The said rollers 19—20 and the gears attached thereto are supported in bearings 25 adjustably secured to the said side frames of the machine. The upper roller 21 is arranged to be resiliently moved into engagement with the rollers 19—20 and is journaled in bearings 26 which are slidably mounted in an upright support 27.

In accordance with the invention the power source of the machine comprises a motor 28 which is supported in any convenient manner between the frames 11—11' at a location for its drive shaft 29 to extend outwardly at the rear of the frame and in a general horizontal direction. A worm 30 is fixed to said shaft 29 and is engaged by a worm gear 31 which is secured to a lateral extending shaft 32 (see Figure 3) at a location substantially midway thereof. This shaft 32 is journaled in bearings 33 attached to the rear end portion of the frames 11—11' in any suitable manner. This shaft 32 also carries bevelled miter gears 34—35 which miter gears engage with similar miter gears 36—37 attached to the said faller screw shafts 13—14, the adjacent portion of said shafts 13—14 being journaled in bearings 38, thus motion is transmitted from the motor 28 through the said gearing described, to the faller screw shafts 13—14.

A worm 39 having a single lead is mounted on the shaft 13 and is engaged by a worm wheel 40 which is fixed to a stub shaft 41 suitably journaled in the frame 11 by means of a bearing 42 fixed or otherwise secured to the said frame 11. A sprocket wheel 43 is secured to the outer end of the shaft 41 for rotation therewith. A sprocket chain 44 is trained over the sprocket wheel 43 and over a smaller sprocket wheel 45 which is carried by the back roller 15 to drive or rotate the same at the appropriate speed with respect to the speed of rotation of the said shaft 13. Since the back rollers feed the slivers into the faller combs, it is not essential that the back rollers revolve as smoothly as the front feed roller of the machine, and the sprocket chain has been found satisfactory in practice for driving the said back rollers. A sprocket idler gear 46 is provided for maintaining the chain 44 under proper tension. This gear 46 is mounted for rotation on a stud 47 which is adjustaby secured to the frame 11. The stud 47 extends beyond the gear 46 and is threaded to be engaged by a nut 48 having a handle 49 thereon for manually turning said nut to clamp the said stud in the desired adjusted position along the frame.

Motion is transmitted from the shaft 32 to the front draft roller 19 by means of a pair of substantially identical meshing spiral gears 50—51 and 52—53 each pair of which is enclosed in a liquid-tight casing providing gear boxes 54—55. The gear box 54 is supported on a shelf or bracket 56 secured on the frame 11' and the adjacent end portion of the lateral shaft 32 extends into the gear box 54 in sealed engagement therewith and has fixed thereto the said spiral gear 50. The gear 51 is fixed on a shaft 57 which extends lengthwise of the frame 11' and is journaled in bearings 58—59 carried by the box 54. The shaft 57 extends outwardly of the box 54 and has a coupling sleeve 60 detachably secured thereto as by means of screws 61. The shaft 57 extends within this sleeve 60 for only a portion thereof for a purpose which will hereafter appear.

The gear box 55 is slidably mounted on a shelf 62 at the opposite end of the frame 11' so as to be at a location adjacent to the front draft roller 20. The gear 52 of the pair of spiral gears enclosed in said gear box 55 is fixed to a shaft 63 which also extends lengthwise of the frame 11' and in axial alignment with the said shaft 57. Shaft 63 is like the shaft 57 journaled in bearings carried on opposite walls of the box 55 extends beyond said box to be received in said sleeve 60 and may there be detachably secured as by means of screws 64. The gear 53 is fixed to a shaft 65 which is suitably journaled in the walls of the box 55 and extends parallel to the shaft 32 and outwardly beyond the outer side wall of the said box 55 and there receives a change gear 66 secured in position as by means of a nut 67 engaging the outer threaded end of the said shaft 65. The change gear 66 extends into engagement with a gear 68 carried by the roller 19 whereby motion is transmitted from the gear box 55 through the change gear 66 to the said roller 19.

In order that the change gear 66 may be moved in and out of engagement with the gear 68, a rack 69 (see Figure 2) is secured to the outer side wall of the gear box 55 as by means of screws 70 and extends lengthwise of the frame 11' into engagement with a pinion gear 71 which is suitably supported on a fixed shaft 72 which is turned by a hand wheel 73. Turning the wheel 73 in the proper direction will slidably move the gear box 55 from or toward the said roller 20. The gear box 55 is secured in adjusted position by means of a tie bolt 74 which extends through the bottom of the gear box 55 and through an elongated slot 75 provided in the shelf 62. The bolt 74 is engaged by a manually manipulated nut 76 which clamps the box 55 to the shelf 62 to permit axial movement between the said sleeve and shaft coupled thereby and prevent relative rotary movement. A key 77 is provided in the walls of the sleeve 60 which is slidably engaged by splines 78—79 provided in the shafts 57 and 63. Each gear box 54—55 is filled with a lubricant 80 whereby the spiral gears contained in said boxes will rotate in a lubricant.

When changing the ratio of the draft of the roller 20, the shaft 63 is disengaged from the sleeve 60 as by means of loosening the screw 64. The box 55 is loosened from the shelf 62 by turning the nut 76 in the proper direction. Turning the wheel 73 in the proper direction will move the said gear box away from the roller 20 to position the gear 66 at a location readily accessible for removing the same and attaching a different change gear to the said shaft 65. After the substitution has been made, the box 55 is slidably moved to engage the gear 66 with the gear 68. The box may be now locked into position by turning the nut 76, and the shaft 63 is attached to the sleeve 60 by tightening the screw 64. The length of the sleeve 60 is such as to provide ample distance for movement of the shaft 63 therein for proviidng for various sizes of change gears 66.

It will now be apparent that I have provided a drive arrangement for a gill drawing machine the elements of which are made of much less weight and arranged in a more compact relation than that possible by the usual gear trains of the prior art. It will also be found apparent that in the arrangement for driving the front draft rollers, a positive smooth drive is provided which results in a better and more even draft of the wool fibers of the slivers processed through the machine.

I claim:

1. In a gear drive for a gill drawing macihne having a front draft roller provided with a gear thereon for rotating the same, a power shaft, a second shaft extending at right angles to said power shaft, a pair of spiral gears connecting said shafts for transmitting motion from said power shaft to said second shaft, a third shaft extending axially in line with said second shaft and spaced endwise thereof, means for detachably securing said second and third shafts to each other, a second pair of spiral gears rotated one from the other and one of which is secured to said third shaft, a slidably mounted spupport for said second pair of spiral gears, said third shaft being journalled in said support and movable therewith, a change gear carried by said support and rotated by said second pair of spiral gears, means manually operable for slidably moving said support for moving said change gear into and out of engagement with the draft roller gear upon disengaging of said second and third shafts, and means for locking said support in adjusted position.

2. In a gear drive for a gill drawing machine having a front draft roller provided with a gear thereon for rotating the same, a power shaft, a second shaft extending at right angles to said power shaft, a pair of spiral gears connecting said shafts for transmitting motion from said power shaft to said second shaft, a third shaft extending axially in line with said second shaft and spaced endwise thereof, means for detachably securing said second and third shafts to each other, a gear box having bearings therein in which said third shaft is journalled, a train of gears in said gear box connected to said third shaft and rotated thereby, a change gear carried by said gear box for engaging the said draft roller gear for transmitting motion thereto from said gear box, means for slidably mounting said gear box, a toothed rack carried by said gear box and a manually rotated gear engaging said rack for moving said change gear in and out of engagement with said draft roller gear upon disengaging said second and third shafts, and means for locking said gear box in adjusted position.

3. In a gear drive for a gill drawing machine having a front draft roller and a back feed roller and a pair of faller screw shafts, each of said rollers having a gear thereon, a motor positioned between said shafts, a power shaft driven from said motor and extending at right angles to said faller screw shafts, pairs of miter gears connecting said power shaft to said faller screw shafts for transmitting motion from said power shaft to said faller shafts, a second shaft extending at right angles to said power shaft, a pair of spiral gears connecting said second shaft to said power shaft, a pair of second spiral gears, one of which is connected to said second shaft for rotation therewith and for transmitting motion to the other of said second spiral gears, a change gear connected to the said other of said second pair of spiral gears and engaging said front draft roller gear, a drive gear, a sprocket chain connecting said back roller gear with said drive gear, a worm carried by one of said faller screw shafts and a worm gear rotatable with said drive gear and engaged by said worm to be rotated thereby.

References Cited in the file of this patent

UNITED STATES PATENTS

| | | |
|---|---|---|
| 632,306 | Bryant | Sept. 5, 1899 |
| 813,654 | Lee | Feb. 27, 1906 |
| 1,167,887 | Clarke | Jan. 11, 1916 |
| 1,565,008 | Howard | Dec. 8, 1925 |
| 1,649,751 | Prince-Smith | Nov. 15, 1927 |
| 1,665,227 | Smith | Apr. 10, 1928 |
| 2,237,466 | Zimmermann | Apr. 8, 1941 |
| 2,436,746 | Drought | Feb. 24, 1948 |